Aug. 14, 1962  H. W. BEATTY, JR., ETAL  3,049,141
ACCUMULATOR CHARGING MECHANISM
Filed May 18, 1959

INVENTORS
Howard W. Beatty, Jr.
Charles E. Brady.
BY
Harness & Harris
ATTORNEYS.

United States Patent Office 3,049,141
Patented Aug. 14, 1962

3,049,141
ACCUMULATOR CHARGING MECHANISM
Howard W. Beatty, Jr., Royal Oak, and Charles E. Brady, Oak Park, Mich., assignors to Chrysler Corporation, Highland Park, Mich., a corporation of Delaware
Filed May 18, 1959, Ser. No. 813,971
6 Claims. (Cl. 137—108)

This invention relates to a hydraulic pressure supply mechanism particularly suitable for use with an automobile central hydraulic system wherein a high pressure hydraulic pump and a hydraulic pressure accumulator cooperate to supply fluid pressure to an assortment of hydraulically powered accessories, such as power steering and power brakes, window regulators, seat adjustment means and the like.

An important object of the present invention is to provide an improved, highly efficient, and particularly simple charging mechanism adapted for economical manufacture for controlling the supply of pressurized fluid to a fluid pressure accumulator and for maintaining the accumulator pressure within predetermined upper and lower limits.

Another object is to provide such a mechanism including an accumulator charging valve means having a shiftable element selectively operable to connect the source of pressurized fluid with the accumulator to charge the latter when the accumulator pressure drops below said lower limit and thereafter until the accumulator pressure attains its upper limit, and to provide a bypass circuit between said source and an exhaust port to prevent charging of the accumulator when its pressure attains said upper limit and thereafter until the accumulator pressure again falls to the lower limit.

Another object is to provide a simple, improved, and effective central hydraulic system adapted for automotive use wherein the available pressurized fluid from a hydraulic pump, up to a predetermined limit of flow, is first directed to a power steering mechanism to operate the same. The excess pump capacity above the aforesaid limit is then applied to charge a pressure accumulator to an upper limiting pressure value, whereupon an accumulator charging valve is actuated to bypass the accumulator and return the pressurized fluid to the pump inlet. The accumulator pressure is employed as required to operate various hydraulically powered accessories until it drops to a lower limiting value, whereupon the accumulator charging valve is operative to direct the aforesaid excess pump capacity to recharge the accumulator to the upper limiting pressure value.

Another object is to provide such an accumulator charging valve cooperable with a fluid motor which in turn is actuated by the accumulator pressure to operate the valve and maintain the accumulator pressure between the lower and upper limiting pressure values.

Another and more specific object is to provide a mechanism of the foregoing character wherein the accumulator charging valve comprises a valve housing having a chamber in communication with the conduit means, which delivers pressurized fluid from the pressure source to the accumulator to charge the same, and a valve element shiftable within the chamber and having one end in communication with the pressure source. The valve element is yieldingly urged in one direction within the chamber by a valve seating spring to an exhaust port closing or accumulator charging position whereat mating seat portions on the valve element and housing at the other ends of the element and chamber respectively are in seated engagement to partition the element and the chamber at said other end into two parts, one of which is in communication at all times with the pressurized fluid. A hydraulic motor actuated by the accumulator pressure when the latter attains a predetermined upper limit cooperates with the valve element to move the same from the port closing position and disengage the mating seat portions to effect communication between both parts of the valve element at said other end. In consequence, the pressurized fluid normally acting on one of said parts is applied against both parts at said other end to move the valve element positively to an exhaust port opening position. An exhaust port opening into the chamber is normally closed by the valve element when the latter is at its valve closing position and is normally in communication with said parts at the other end of the valve element when the latter is at its port opening position, thereby to effect a bypass circuit for the pressurized fluid and to prevent charging of the accumulator above the desired upper limit. A one-way check valve in the conduit between the valve housing and the accumulator prevents loss of accumulator pressure when the pressurized fluid charging the accumulator fails, as for example when the hydraulic pump is not operating.

Another object is to provide such a mechanism wherein the valve housing has an annular tapered seat at the aforesaid other end of the chamber for the valve element, which seat is abutted by an annular seat on said other end of the valve element. The latter seat is offset radially inwardly from the outer periphery of the valve element, so that when the two seats are in seated engagement, said other ends of the valve element and chamber are partitioned into two parts as aforesaid, comprising inner and outer parts. A duct extending through the valve element from said one end thereof to the inner part maintains the latter in communication with the pressure source. An axially shiftable rod extending into said other end of the chamber abuts said inner part of the valve element and is thus opposed by the pressure of said source when the valve and housing seats are in seated engagement. The hydraulic motor is engaged with the rod to move the same and the valve element in opposition to the seating spring when the accumulator pressure exceeds its predetermined upper limit.

By virtue of the foregoing structure, when the valve and housing seats are disengaged to connect said other end of the chamber to the exhaust, the force of the valve element opposing movement of the rod is decreased and the motor is enabled to move the rod and valve element to crack open a connection between the chamber and exhaust port. At this position the pressure in the chamber and correspondingly the pressure opposing movement of the rod rapidly reduces, enabling the motor to shift the valve element positively to the exhaust port opening position and to hold the valve at the latter position until the accumulaor pressure, which actuates the motor, drops to its lower limiting value.

On the other hand, when the accumulator pressure falls to its lower limiting value, the valve seating spring urges the valve element to the exhaust port closing position, whereat the exhaust port is closed to said other end of the chamber. The pressure in said other end of the chamber opposing movement of the rod in the direction to disengage the valve and housing seats then rises to the value of the pressure source, causing the motor actuated rod to return with a positive snap action to the initial exhaust port closing or accumulator charging position. The valve seating spring and fluid pressure acting on the valve element are then adequate to move the valve element with a similar positive snap action into its seating engagement with the valve housing.

Other objects of this invention will appear in the following description and appended claims, reference being had to the accompanying drawings forming a part of this specification wherein like reference characters designate corresponding parts in the several views.

It is to be understood that the invention is not limited in its application to the details of construction and arrangement of parts illustrated in the accompanying drawings, since the invention is capable of other embodiments and of being practiced or carried out in various ways. Also it is to be understood that the phraseology or terminology employed herein is for the purpose of description and not of limitation.

Figure 1:
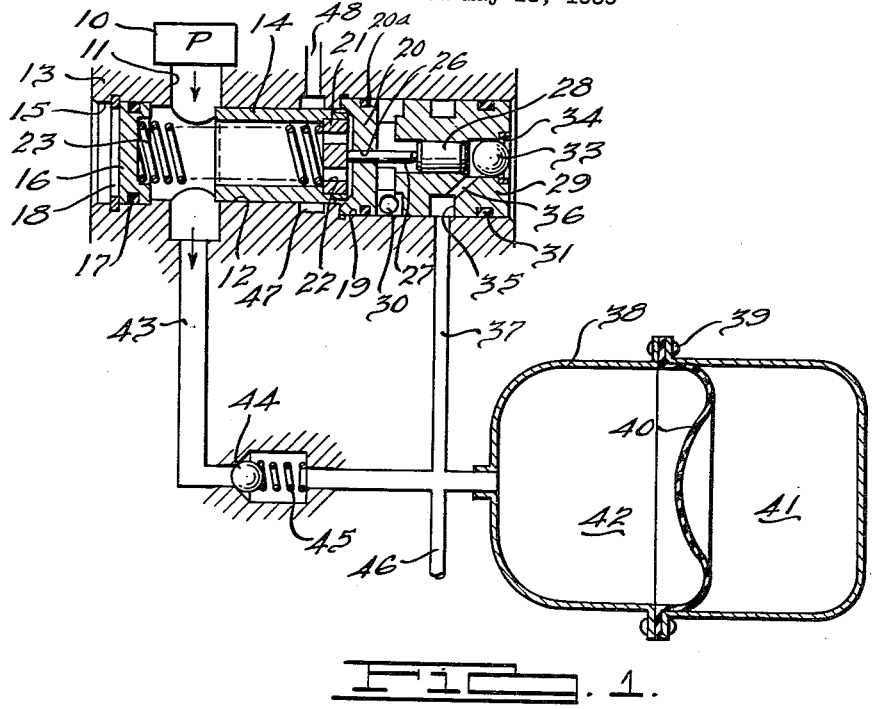
FIGURE 1 is a fragmentary schematic mid-sectional view showing a hydraulic system embodying the present invention, with the valve in the accumulator charging or exhaust port closing position.

Referring to the drawings, a suitable source of fluid pressure is indicated at P and may comprise as in the present instance the pressure supplied by an automobile engine driven hydraulic pump. A conduit 11 connects the pressure source P with a cylindrical chamber 12 within a valve housing 13. Slidable axially within the chamber 12 is a hollow cylindrical valve element 14 having its outer periphery in hydraulic sealing engagement with the inner periphery of the chamber 12. One end of the chamber 12, the left end in FIGURE 1, is enlarged at 15 and is provided with an end closure 16 having an annular seal 17 recessed into its outer periphery. A C-ring partially recessed into the housing 13 exteriorly of the closure 15 retains the latter in place.

The other or right end of the chamber 12 is enlarged at 19 and is provided with an end closure 20 tightly fitted in place to comprise a unitary structure with the housing 13. Where desired the outer periphery of the closure 20 is provided with an annular seal 20a.

The tubular valve element 14 is open at its left end to the pressure of source P and is provided with a perforated end plate 21 pressed securely into its other end. The perforations 22 in plate 21 provide communication between the pressure source P and the portion of the chamber 12 to the right of plate 21. A valve seating or biasing spring 23 within the bore of valve element 14 and under compression between the closure 16 and plate 21 urges the latter and valve element 14 to the right to an accumulator charging or port closing position described below.

Figure 2:
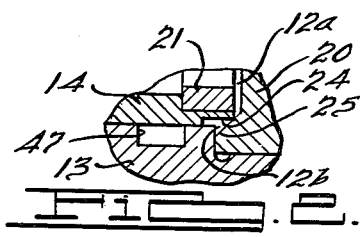
FIGURE 2 is a fragmentary enlarged view similar to FIGURE 1 showing a portion of the mating valve seats in seated engagement at the port closing position.
Figure 3:
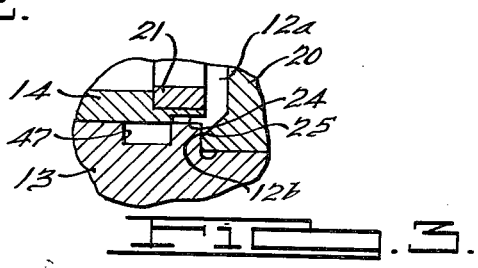
FIGURE 3 is a view similar to FIGURE 2, but showing the valve seats separated slightly by operation of the hydraulic motor.
Figure 4:
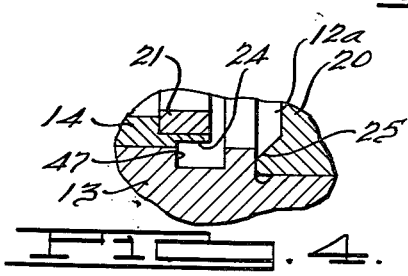
FIGURE 4 is a view similar to FIGURE 2, but showing the valve elements at the port opening position whereat the exhaust port is connected to the fluid pressure.

Referring to FIGURES 2–4, the peripheral right end portion of valve element 14 is reduced in diameter to provide an end or head 24 adapted to abut an annular tapered seat 25 on the housing closure member 20, thereby to effect a fluid seal partitioning the portion of the chamber 12 at the right end of element 14 into an inner circular portion 12a and an outer annular portion 12b, the inner portion being in communication with the fluid pressure P via ducts 22.

Coaxially with chamber 12 and valve element 14 is a bore 26 through the end closure 20 for an axially shiftable piston actuated rod 27 having its left end abutting plate 21. A plunger or piston 28 engaging the right end of rod 27 is reciprocable in the bore of a cylinder 29 which is pressed tightly into the enlargement 19 and is spaced from closure 20 to accommodate a drain port 30. A suitable annular fluid seal 31 recessed into cylinder 29 near its right end prevents endwise loss of fluid pressure between the cylinder 29 and the chamber enlargement 19. The bore of cylinder 29 enlarges at its right end to contain a ball closure member 33 which seats within the circular opening of an annular seat member 34 press fitted in fluid sealing engagement within a second enlargement of the bore of cylinder 29, thereby to close the right end of the cylinder and prevent loss of fluid pressure at the left of ball 33.

An annular port or recess 35 formed in the outer periphery of cylinder 29 communicates via duct 36 with the bore of cylinder 29 at a location between the ball 33 and piston 28 and communicates via conduit 37 with a pressure accumulator 38. The latter may be of conventional construction and comprises in the present instance two dished shells secured together by rivets 39. A flexible diaphragm 40 serves both as a fluid sealing gasket at the juncture between the two parts of the accumulator shell and also partitions the latter into a gas-filled chamber 41 and a chamber 42 for pressurized hydraulic fluid. The latter chamber is an communiaction with conduit 37 and is supplied with pressurized hydraulic fluid from source P via conduit 43 connected with chamber 12 at the left end of valve element 14. A one-way check valve comprising a ball element 44 and spring 45 operates in a conventional manner to allow fluid flow into chamber 42 when the pressure in chamber 12 exceeds the accumulator pressure, and prevents discharge of the accumulator pressure when the pressure in chamber 12 drops below the accumulator pressure. A working conduit 46 also connected with chamber 42 supplies accumulator pressure to various hydraulically operated mechanisms, such as the automobile brakes, window regulators and the like. A second annular drain or exhaust port 47 recessed into housing 13 around valve element 14 is normally closed by the latter at the accumulator charging or exhaust port closing position shown in FIGURES 1 and 2, and communicates via conduit 48 with a sump on the inlet side of the pump which supplies the pressure P.

FIGURE 1 illustrates the condition of the accumulator charging valve when the accumulator is being charged, as for example, when its pressure is below a predetermined minimum value of approximately 425 p.s.i. for example and the vehicle engine is running to operate the hydraulic pump. In this condition, fluid flow from the source P enters chamber 12 via duct 11 and discharges from chamber 12 via duct 43 into accumulator chamber 42. As the accumulator pressure increases, the gas in chamber 41 is compressed to a smaller volume and the volume of chamber 42 increases as it is charged with pressurized fluid. While the accumulator is charging, the force of spring 23 combined with the pressure of the source P acting on the effective area of valve element 14, which corresponds to the area of an annulus having outer and inner diameters equal to the diameters of the valve element 14 and head 24 respectively, urges valve element 14 to the right of effect fluid sealing seated engagement between the portions 24 and 25. Thus exhaust port 47 is closed to the pressurized fluid within chamber portion 12a.

When the accumulator pressure reaches a predetermined upper limit, approximating 575 p.s.i. for example, the pressure at the right end of piston 28 supplied via conduits 36 and 37 urges piston 28 and rod 27 against plate 21 with sufficient force to overcome spring 23 and the aforesaid pressure on valve element 14 and disengage head 24 from seat 25. Thus communication is established between chamber portions 12a and 12b and the hydraulic pressure forces acting on valve element 14 come into complete balance. The accumulator pressure acting on piston 28 is then enabled to move rod 27 and valve element 14 approximately to the position shown in FIGURE 3 and either open exhaust port 47 to chamber 12 at the right of plate 21, or to shorten the fluid leakage path between the latter port and chamber 12, thereby to reduce the fluid pressure opposing leftward movement of rod 27. In consequence, valve element 14 is moved with a positive snap action completely to the port opening position shown in FIGURE 4 whereat the pressure of source P bypasses accumulator 38 via ducts 22 and exhaust port 47 to prevent charging of accumulator 38 above the aforesaid predetermined upper limiting pressure value.

When the accumulator pressure drops below its aforesaid lower limiting value, spring 23 urges valve element 14 to the right sufficiently to close exhaust port 47 from the portion of chamber 12 at the right of plate 21. Immediately, the pressure in the latter chamber portion begins to rise, increasing the fluid pressure force on the left end of rod 27 and causing valve element 14 to snap rightward to the seating position of FIGURES 1 and 2. At this position head 24 seats at seat 25 to close chamber portion 12b from the pressure of source P, thereby to reduce the fluid pressure force urging leftward movement of valve element 14 and to effect a resultant holding force maintaining valve element 14 at its seated position, FIGURE 1, until the accumulator pressure again exceeds its predetermined upper limit.

We claim:

1. In an accumulator charging valve means defining a chamber having an inlet and an accumulator charging outlet in communication with said chamber, said valve means also having a valve seat therein and an exhaust port, a slide valve element reciprocal in said chamber between seated and open positions by movement in seating and opening directions respectively, said valve element having a head seating at said seat when at said seated position and being shiftable to an intermediate position between said seated and open positions upon being unseated from said seat, valve biasing means yieldingly urging said valve element in said seating direction, said valve element having a first portion responsive to the pressure in said chamber to urge said valve element in said seating direction, said valve element and seat cooperating at said seated position to partition a second portion of said valve element from the pressure in said chamber and to establish communication between said chamber and second portion when said head is unseated from said seat, means blocking communication between said second portion and exhaust port when said head is at said seated and intermediate positions, said second portion being responsive to said fluid pressure thereon to urge said valve element in said opening direction, a fluid pressure actuated motor having valve actuating means operatively connected with said valve element, said motor having a supply conduit adapted to be connected with the pressure of an accumulator and being responsive to a predetermined value of the latter pressure to urge said valve element in said opening direction to unseat the same and establish communication between said second portion and chamber, thereby to apply additional force assisting said motor to urge said valve element in said opening direction, said valve actuating means being responsive to the fluid pressure in said chamber to oppose movement of said valve element in said opening direction, said valve element being effective at said open position to connect said chamber and exhaust port, thereby to decrease the pressure in said chamber and the force on said actuating means opposing movement of said valve element toward said open position.

2. In the combination according to claim 1, said valve element and seat cooperating at said seated position to partition one side of said valve element into said second and a third portion, and said actuating means comprising a rod extending into said chamber at said one side of said element and engaging said third portion to urge said valve element in opposition to said valve biasing means upon actuation of said motor, and means connecting said third portion with the fluid pressure of said chamber at all times.

3. In the combination according to claim 1, said means blocking communication between said second portion and exhaust port including a fluid leakage path from said second portion to exhaust fluid pressure therefrom when said head is at said seated position.

4. In the combination according to claim 1, said means blocking communication between said second portion and exhaust port including a fluid leakage path from said second portion to exhaust the fluid pressure therefrom when said head is at said seated and intermediate positions, said element and chamber cooperating to decrease the fluid resistance of said leakage path upon progressive movement of said head toward said open position.

5. In the combination according to claim 4, said first and second portions of said valve element having equal effective areas exposed to the pressure of said chamber when said valve element is unseated.

6. In an accumulator charging valve means having a chamber and a relatively shiftable valve element within said chamber, said chamber having an inlet and an accumulator charging outlet in communication with each other and with one side of said valve element to urge the latter to a port closing position, a valve head extending around a central portion of said valve element at the other side thereof and partitioning the latter side into inner and outer parts by engagement with a wall portion of said chamber when said element is at said port closing position, said valve element having a duct extending therethrough from said one side to said other side at the region of said inner part and connecting said inner part at all times with the pressure at said inlet, said outer part being exposed to the pressure of said inlet when said element is shifted from said engagement with said wall portion, spring means yieldingly urging said valve element to said port closing position, a hydraulically actuated motor adapted to be connected with the pressure of an accumulator to be actuated thereby, said motor having a plunger extending into said chamber and engaging said inner part to urge said valve element in opposition to said spring means from said port closing position to effect communication between the outer of said two valve parts and said chamber, thereby to increase the area at said other side exposed to said inlet pressure to assist said motor to urge said valve element in opposition to said spring means to a port opening position, an exhaust port discharging from said chamber, said valve element having a portion closing said exhaust port until said valve element is urged in opposition to said spring means through an intermediate position to said port opening position, said plunger being responsive to the fluid pressure in said chamber to oppose movement of said valve element in opposition to said spring means, and said outer part of said other side being in communication with said exhaust fluid pressure thereinto when said valve element is at said port opening position, thereby to decrease the pressure in said chamber and the force on said plunger opposing movement of said valve element.

References Cited in the file of this patent
UNITED STATES PATENTS

| | | |
|---|---|---|
| 813,971 | Thomas | July 4, 1939 |
| 2,614,580 | Cormier | Oct. 21, 1952 |
| 2,649,119 | Deardorff | Aug. 18, 1953 |
| 2,680,447 | Groves | June 8, 1954 |
| 2,989,971 | Valentine | June 27, 1961 |